No. 893,339. PATENTED JULY 14, 1908
H. C. MALLORY.
PROCESS OF REGULATING HEATING SYSTEMS.
APPLICATION FILED MAY 20, 1903.
3 SHEETS—SHEET 3.
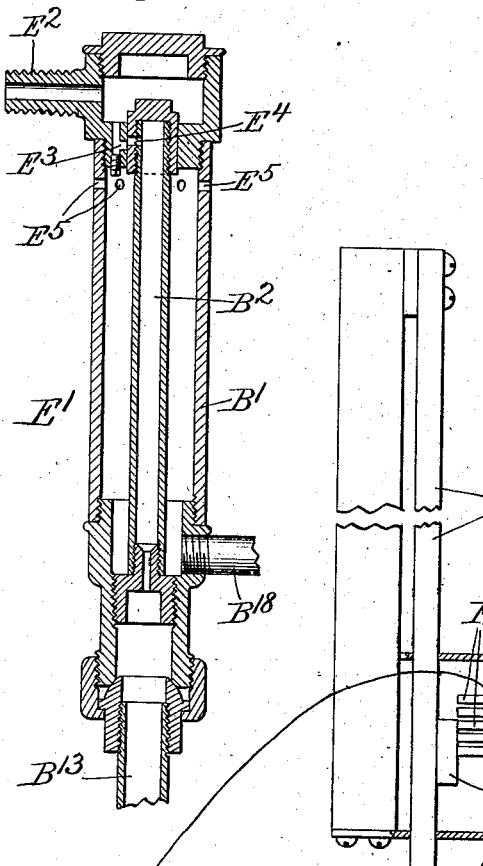
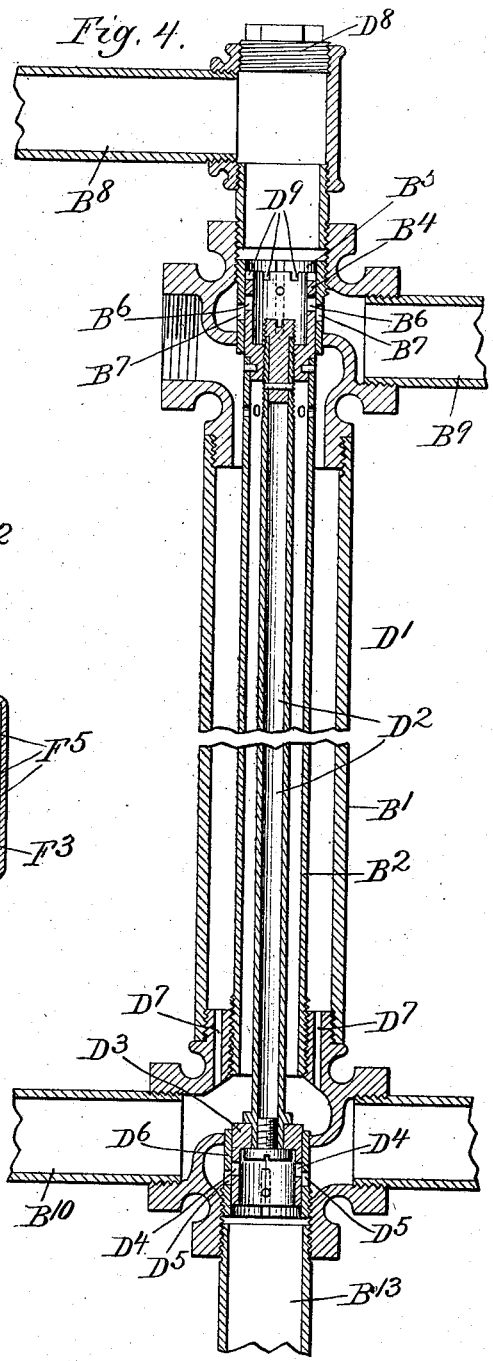
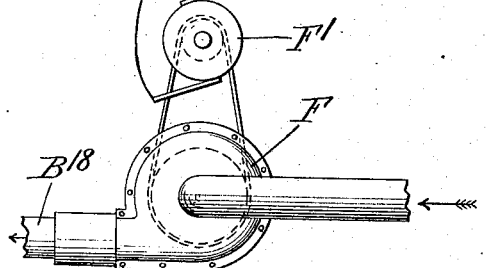
Witnesses.
Edward T. Wray.
Homer L. Kraft.
Inventor.
Harry C. Mallory.
by Parker Carr
Attorney's.

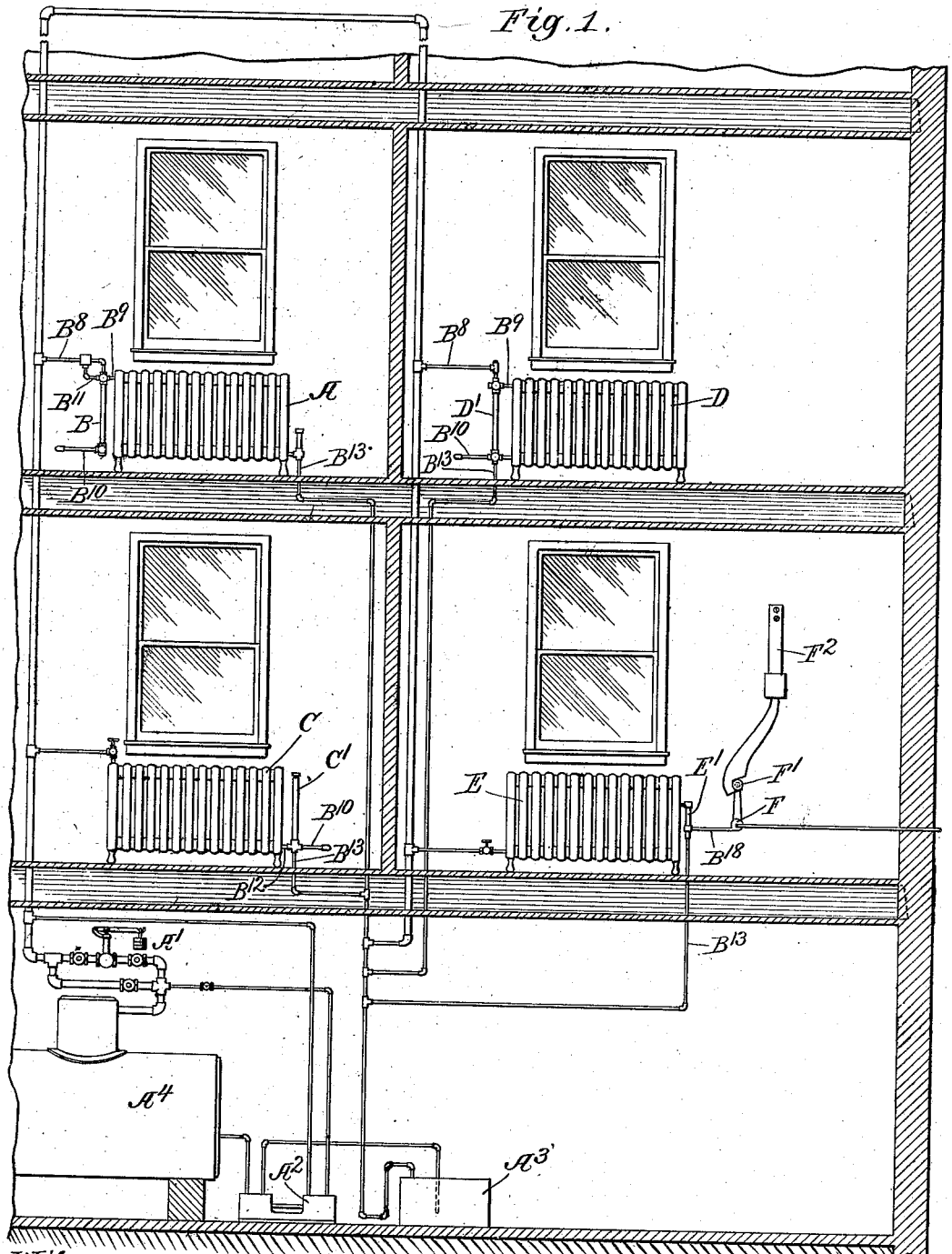

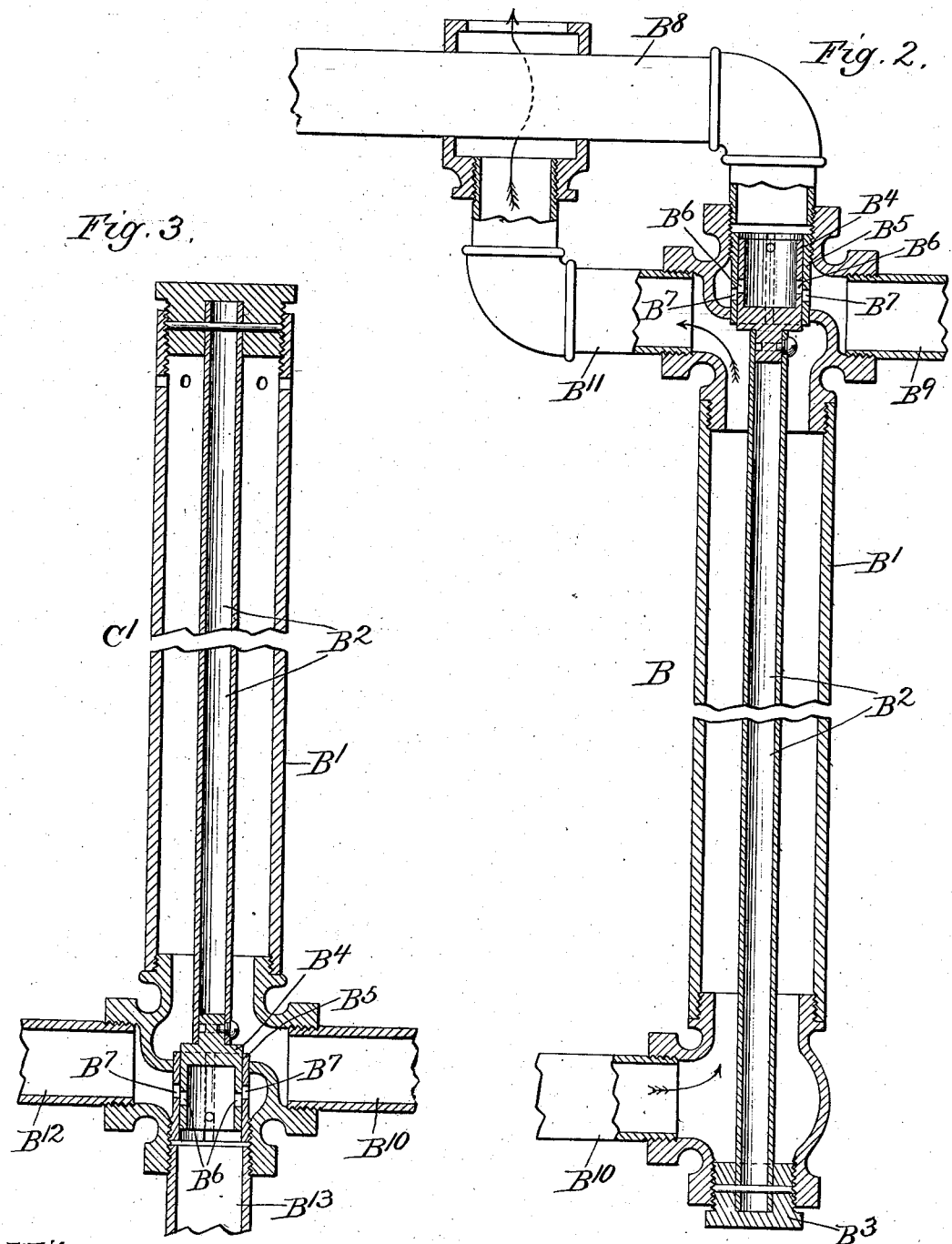

UNITED STATES PATENT OFFICE.

HARRY C. MALLORY, OF CHICAGO, ILLINOIS.

PROCESS OF REGULATING HEATING SYSTEMS.

No. 893,339.  Specification of Letters Patent.  Patented July 14, 1908.

Application filed May 20, 1903. Serial No. 158,039.

*To all whom it may concern:*

Be it known that I, HARRY C. MALLORY, a citizen of the United States, residing at Chicago, in the county of Cook and State of Illinois, have invented a certain new and useful Improvement in Processes of Regulating Heating Systems, of which the following is a specification.

My invention relates to a new and improved process of regulating heating systems and devices and has for its object to provide a new and improved process of this description.

My invention is illustrated in the accompanying drawings, wherein

Figure 1 is a diagrammatic view showing means by which my process may be carried out; Fig. 2 is an enlarged sectional view showing one form of controlling valve; Fig. 3 is a sectional view showing another form of controlling valve; Fig. 4 is a sectional view showing a form of compound controlling valve; Fig. 5 is a view of the valve for controlling the escape of the air; Fig. 6 is a diagrammatic view showing a controlling device for the external air.

Like letters refer to like parts throughout the several figures.

In the heating of apartments and the like, it is exceedingly desirable to secure in the apartment a proper temperature and maintain that temperature. With the ordinary heating devices now on the market, this result is not secured because of the variation of the external temperature, that is the variation of the temperature of the outside atmosphere. If, for example, a steam radiator is made of the proper size and is supplied with the proper amount of steam to heat the apartment to the proper temperature under certain conditions of the external atmosphere, the lowering of the temperature of the external atmosphere will throw the system out of balance and the radiator will be unable to keep the temperature up to the desired point and it will fall below that desired. On the other hand, if the external temperature should rise, the radiator will be able to produce more heat than is required and the temperature of the apartment will be carried above the desired point. It will therefore be seen that, if the condition of the system remains the same and the capacity of the radiator remains unaltered, the variations of the external atmosphere produce corresponding variations in the temperature of the apartment, and my present invention has as one of its objects to obviate this undesirable condition.

In carrying out my process, I vary, as it were, the capacity of the heater to give out heat; and I do this either by controlling the heating fluid directly or the water of condensation etc. or both, responsive to or by variations of the temperature of the external atmosphere.

In the particular embodiment of my invention hereinafter disclosed I have controlled the heating fluid by a thermostatic valve and I have found that to get the best results it is desirable that the actuating mechanism of said valve should be subjected to the action of a stream of temperature changing fluid forced to flow through or by said mechanism. This stream may be air, drawn from the external atmosphere.

The stream of air serves to cool the thermostatic actuation mechanism and the latter is warmed by heat more or less directly derived from the heating fluid. The stream of air should not materially affect the temperature of the apartment heated except as it does so through its action on the actuating mechanism of the valve controlling the flow of the heating fluid. With the apparatus illustrated herein the volume of air flowing in the regulating stream is so slight that its escape into the apartment does not affect in a material degree the temperature of the apartment.

Referring now to Fig. 1, I have shown for purposes of illustration a diagrammatic representation of a heating system. This is shown as a low pressure or vacuum system, but it is of course evident that my invention is applicable to any ordinary heating system. In this diagrammatic representation, I have illustrated the source of supply of the heating fluid as the boiler $A^4$ and the heating fluid is carried to the heaters by suitable pipes or the like. I have also illustrated a reducing pressure valve $A^1$ in the pipe leading from the boiler. I provide a by-pass around this valve which may be used when desired. A suitable pump or the like $A^2$ is provided for producing a low pressure or vacuum and for controlling the water of condensation. The radiators are connected by suitable pipes to a tank or the like $A^3$, into which the water of condensation is returned. The radiator A is provided with a controlling valve B for controlling the admission of the steam and this controlling valve is responsive to variations in the external atmosphere.

One form of this valve is illustrated in Fig. 2. As shown in this figure, the valve is provided with an outer surrounding part or member $B^1$, which is preferably of a material having a low coefficient of expansion, such for example as iron. Within the part $B^1$ is another part or member $B^2$ made of material having a high coefficient of expansion, such for example as brass. The inner member $B^2$ is fastened at one end to the outer member or some part associated therewith and is preferably adjustably fastened, so as to permit the parts to be adjusted relatively. This may be done in any desired manner, as by fastening the part to a nut $B^3$ as shown. The inner or expanding member $B^2$ is connected to a piston $B^4$, which works in a casing or surrounding part $B^5$. The piston $B^4$ is provided with ports or openings $B^6$, which coöperate with ports or openings $B^7$ in the surrounding part or casing. These various ports are adjusted with relation to each other to correspond with the conditions met with. The heating fluid, which in this instance may be steam, is admitted by means of pipe $B^8$ and the piston $B^4$ is formed so that the steam enters into it and thus has access to the ports $B^6$. The heating fluid passes to the radiator through ports $B^6$ and $B^7$ and the pipe $B^9$. A pipe $B^{10}$ connects with the controlling valve and communicates with the external atmosphere. This external atmosphere passes in through this pipe and between the members $B^1$ and $B^2$ so as to make contact therewith and then passes out through the pipe $B^{11}$. The pipe $B^{11}$ is preferably arranged at its ends so as to surround or be associated with the steam pipe $B^8$ and is open. By this means the heat from the steam pipe tends to produce an aspirating effect, that is tends to assist in drawing the external air through the controlling valve. Since this valve is operated by temperatures instead of pressures, it may be termed a thermo-motor valve.

If, for example, the controlling valve is arranged so as to admit just the proper amount of steam to keep the temperature in the apartment at the desired point and the external temperature should fall, the air passing through the valve and in contact with the member $B^2$ will at once become lower in temperature. This contracts the member $B^2$ and causes the piston $B^4$ to be drawn down, thus increasing the area of the ports $B^6$ which register with the ports $B^7$, and hence a greater amount of steam can pass through the ports into the radiator. The radiator will therefore be capable of developing more heat and thus prevent the temperature from falling to correspond with the fall of the temperature of the external atmosphere, and by a proper adjustment of the parts it will be seen that the temperature in the apartment may be prevented from varying and thus held practically constant. If on the other hand the external temperature rises, the air passing through the valve will also rise in temperature in a corresponding manner and this rise in temperature will cause the member $B^2$ to expand, thus moving the piston $B^4$ so as to decrease the area of the ports $B^6$ which register with the ports $B^7$. Under these conditions, a decreased quantity of steam will be admitted to the radiator and its capacity to develop heat will thus be lessened so that it will not be able to raise the temperature of the apartment above the desired point.

It will thus be seen that by a proper adjustment and relation of the several parts the heating capacity of the radiator may be automatically controlled in response to the variations in the external atmosphere, so as to keep the temperature of the apartment uniform or constant, and the cause which produces the undesirable fluctuation in the temperature of the apartment is thus utilized to prevent this undesirable fluctuation.

Instead of directly controlling the admission of the steam to the radiator, I may secure the same results by controlling the escape of the water of condensation, and this may be done by means of a valve similar to that shown in Fig. 2, the parts being as it were inverted. I have shown the application of this valve at radiator C, Fig. 1, and an enlarged section of the valve $C^1$ is shown in Fig. 3. In this construction the water of condensation passes to the valve from the radiator through the pipe $B^{12}$ and then passes by pipe $B^{13}$ to the return pipe, the amount of water escaping depending upon the position of the piston $B^4$. The pipe $B^{10}$ is connected with the outer atmosphere and this permits the air from without to pass up along the inner member $B^2$. If, for example, the parts are adjusted so as to secure the proper temperature in the apartment and the external temperature falls, the air passing in contact with the member $B^2$ will become colder and said member will be contracted so as to raise the piston $B^4$. This movement increases the area of the ports $B^6$ which register with the ports $B^7$ and permits more of the water of condensation to escape, thus causing more steam to enter the radiator and increasing its heating capacity so as to prevent the temperature of the apartment from falling. If the external temperature rises, the air in contact with the member $B^2$ becomes warmer and expands said member so as to lower it and decrease the opening through which the water escapes, thus permitting less water to escape and causing the water to accumulate and reduce the heating capacity of the radiator. It will thus be seen that by proper adjustment of the parts the heating capacity of the radiator will be automatically adjusted in response to variations in the temperature of the external atmosphere, to prevent variations in the apartment to be heated.

In Fig. 4, I have shown a valve for controlling both the admission of steam and the discharge or escape of the water of condensation. I have illustrated this valve in Fig. 1 at $D^1$ and as applied to the radiator D. In this construction there is a member $B^1$ and a member $B^2$ and inside the member $B^2$ is a member $D^2$ of a material preferably having a low coefficient of expansion. This member $D^2$ is connected preferably adjustably with the member $B^2$, or the piston $B^4$, and is provided at its lower end with a piston $D^3$ having ports $D^4$ coöperating with ports $D^5$ in the surrounding casing $D^6$. The piston $B^4$ controls the admission of steam, as in Fig. 2, while the piston $D^3$ controls the escape of the water of condensation as in Fig. 3. The external atmosphere passes in between the members $B^2$ and $D^2$ and through openings $D^7$ between the members $B^2$ and $B^4$ and passes out at the top of the valve. If the temperature of the outside atmosphere drops, both pistons are moved downwardly, so as to increase the openings through which the steam enters and the water escapes. If the external temperature rises, both pistons will be moved upwardly, so as to decrease the area through which steam enters and the water escapes. I prefer to provide concealed adjusting means for this valve, as for example by providing the steam pipe $B^8$ with a removable plug $D^8$, which when open permits the admission of a suitable tool to engage the groove or other suitably formed part on the member $D^2$ so that it may be turned, and also the admission of a tool to engage the slots or the like $D^9$ on the piston, so that the member $B^2$ may be turned to secure adjustment.

I have shown in connection with the radiator E, Fig. 1, a device for controlling the escape of the air from the radiator. This valve $E^1$ is illustrated in Fig. 5. It is connected to the radiator by the part $E^2$. The air from the radiator passes through ports $E^3$ and $E^4$ into the inner member $B^2$, and thence to the air pipe. The external atmosphere passes in through the pipe $B^{18}$ and out through the openings $E^5$. The action of the valve is the same as that of the other valves heretofore described. In this case I may provide means for controlling the amount or rapidity of the flow of the external air through the valve by means of the temperature in the apartment, thus insuring a speedy action of the device. This may be accomplished by inserting a controlling device in the passage through which this external air passes, responsive to variations in the temperature of the apartment. Various devices of this kind may be used. For example I may place a fan F in this air passage-way, operated by an electric motor, $F^1$, the speed of which is controlled by a thermostat or like device responsive to variations in the temperature of the apartment. I have shown such a device diagrammatically in connection with radiator E, wherein a thermostat provided with the expansible member $F^2$ is provided with a contact piece $F^3$, which moves over contacts $F^4$, between which are the electrical resistances $F^5$. If the temperature in the apartment falls too low, the member contracts and makes contact with more of the contacts $F^4$, thus short-circuiting them and cutting out some of the resistance in the motor circuit and causing the motor to speed up. This increases the speed of the flow of air through the valve and tends to hasten the action of the valve to increase the heating capacity of the heater, and hence the regulation is responsive both to the external atmosphere and the temperature of the apartment. If the temperature in the apartment rises, the thermostat expands and more resistance is cut in and the speed of the motor decreased so as to decrease the flow of air through the valve. This decreased flow of air will not therefore act so strongly upon the valve, and hence the valve will act to decrease the heating capacity of the radiator.

It is of course evident that this arrangement may be used with any of the other valves, and such an arrangement would be particularly advantageous where the apartment to be heated has doors or windows which are opened often.

I claim:

1. The process of securing efficient regulation of a device for heating an apartment, in which the circulation of a heating fluid is controlled by a thermostatic valve which consists in warming the thermostatic actuating mechanism of said valve by heat derived from the heating fluid passing through the radiator and cooling said mechanism by action on it with a stream of air, without materially modifying by said stream the temperature given to the apartment, except as said stream by its action on the thermostatic actuating mechanism modifies the flow of the heating fluid.

2. The process of regulating the heating efficiency of a heat radiator unit supplied by heating fluid, which consists in gradually varying the flow of such fluid to the radiator unit, responsive to variations in temperature of the external atmosphere, and in further varying said flow of fluid to the radiator unit responsive to changes in the temperature of the apartment to be heated.

3. The process of securing efficient regulation of a device for heating an apartment, in which the circulation of a heating fluid is controlled by a thermostatic valve, which consists in warming the thermostatic actuating mechanism of said valve by heat derived from the heating fluid passing through the radiator and cooling said mechanism by acting on it with a stream of air, without materially modifying by said stream the temperature given to the apartment, except as said stream by its action on the thermostatic actuating mechanism modifies the flow of the heating fluid and automatically varying the flow of said stream in response to variations in the temperature of the apartment heated.

4. The process of securing efficient regulation of a device for heating an apartment, in which the circulation of a heating fluid is controlled by a thermostatic valve which consists in warming the thermostatic actuating mechanism of said valve by heat derived from the heating fluid passing through the radiator and cooling said mechanism by action on it with a stream of air of the temperature of the external atmosphere, without materially modifying by said stream the temperature given to the apartment, except as said stream by its action on the thermostatic actuating mechanism modifies the flow of the heating fluid.

5. The process of securing efficient regulation of heating devices, in which the circulation of the heating fluid is controlled by a thermostatic valve, which process consists in acting on the thermostatic actuating mechanism of said valve by a stream of a cooling medium and varying the flow of said stream as the temperature conditions of the apartment heated may require.

6. The process of securing efficient regulation of heating devices, in which the circulation of a heating fluid is controlled by a thermostatic valve which process consists in acting on the thermostatic actuating mechanism of said valve by a stream of a temperature changing medium of the temperature of the external atmosphere and varying the flow of said stream in response to variations in the temperature of the apartment to be heated.

7. The process of securing efficient regulation of heating devices, in which the circulation of the heating fluid is controlled by a thermostatic valve, which process consists in acting on said actuating mechanism by a stream of cooling air drawn from the external atmosphere and controlling the flow of said stream in response to variations in the temperature of the apartment to be heated.

8. The process of securing efficient regulation of a device for heating an apartment, in which the circulation of a heating fluid is controlled by a thermostatic valve which consists in warming the thermostatic actuating mechanism of said valve by heat derived from the heating fluid passing through the radiator and cooling said mechanism by acting on it with a stream of air of the temperature of the external atmosphere, without materially modifying by said stream the temperature given to the apartment, except as said stream, by its action on the thermostatic actuating mechanism, modifies the flow of the heating fluid, and automatically varying the flow of said stream in response to variations in the temperature of the apartment heated.

HARRY C. MALLORY.

Witnesses:
HOMER L. KRAFT
FANNY B. FAY.